3,238,231
WATER-SOLUBLE SULFONIC ACID DERIVATIVES OF BENZANTHRONYLAMINOANTHRAQUINONES
Joseph Deinet, Woodcliff Lake, N.J., assignor to E. I. du Pont de Nemours and Company, Wilmington, Del., a corporation of Delaware
No Drawing. Filed Mar. 19, 1962, Ser. No. 180,807
4 Claims. (Cl. 260—363)

This invention relates to water-soluble sulfonic acid derivatives of benzanthronylaminoanthraquinones which are dyes for cellulosic material as well as dyes for wool, silk, nylon and related fibers which are ordinarily capable of being dyed with acid wool dyestuffs.

While water-soluble anthraquinone dyes have been prepared by the sulfonation of benzanthronylaminoanthraquinone compounds such as disclosed in U.S. Patent 2,227,543, these dyes have not been disclosed as useful on cotton, and they do not give full color values when dyed on cotton by the process hereinafter disclosed.

Sulfonic acid derivatives of arylamino-substituted benzanthronylaminoanthraquinones have also been disclosed in U.S. Patent 2,293,709 in which the sulfonic acid groups are introduced into the arylamino radicals. The arylamino radicals of this patent are those of the benzene and naphthalene series into which the sulfonic acid groups are readily introduced. While these dyes when carrying the sulfonic acid groups only on the arylamino radicals may be used in the dyeing of wool, they have not been disclosed as useful for the dyeing of cotton.

It is an object of the present invention to produce water-soluble sulfonic acid derivatives of higher molecular weight benzanthronylaminoanthraquinone compounds which dye wool in brown-to-black shades which have superior light fastness over previously known dyes of this series. A further object of the invention is to provide water soluble sulfonic acid derivatives of higher molecular weight benzanthronylaminoanthraquinone compounds which are useful as dyes for cotton and other cellulosic materials on which they show superior strength over the heretofore known lower molecular weight dyes of this series.

The dyes of the present invention are water-soluble sulfonic acid derivatives of benzanthronylaminoanthraquinone compounds having the molecular linkages:

(a)     X—Bz—NH—Aq—NH—Bz—X
(b)     X—Aq—NH—Bz—NH—Aq—X
(c)     X—Bz—NH—Aq—NH—Aq—X in which Bz and Aq stand for benzanthronyl and anthraquinonyl radicals, respectively, and X stands for hydrogen or a radical of the group consisting of —NH—Bz, —NH—Aq, —NH—Bz—NH—Aq —NH—Aq—NH—Bz and —NH—Aq—NH—Aq each benzanthronyl radical in said compounds forming with an aminoanthraquinonyl radical a nucleus of the formula:

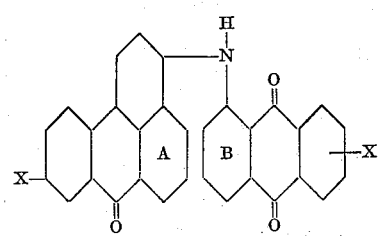

in which X stands for the same as above, there being not more than three Bz radicals and not more than a total of five Aq and Bz radicals in each complete molecule; in each case where the benzanthronyl radical is attached to a second anthraquinonyl radical in the molecule, it is through its 9-position to an alpha position of said second anthraquinonyl radicals; the anthraquinonyl radicals when connected to each directly through —NH— are through alpha-alpha- or alpha-beta-imino linkages, and simple substitution products of said benzanthronyl-aminoanthraquinone compounds, said substituents being of the group comprising —Cl, —Br, —NH$_2$, —CH$_3$, and benzoylamino which are non-sulfonatable, and prior to sulfonation there being no substituent in the rings A and B; said compounds containing from 1 to 3 sulfonic acid (SO$_3$M) groups, and when employed as vat dyes containing at least one sulfonic acid (SO$_3$M) group per benzanthronyl radical in the molecule in which M stands for H, alkali metal (more particularly Na and K) or ammonium.

The water-soluble benzanthronylaminoanthraquinones having the formula given above are prepared by sulfonating the benzanthronylaminoanthraquinones under conditions which are believed to result in at least one sulfonic acid group entering the benzanthronyl 4-position or the anthraquinone 2-position, although this has not been definitely established. The sulfonation is carried out to where the dye is water-soluble. By the term "water soluble," we include those compounds, which, although not readily soluble in cold water, are completely soluble in water at or near the boiling point.

Sulfonation of these benzanthronylaminoanthraquinones is preferably carried out in from 4 to 10 parts by weight of the sulfonating acid per part of the benzanthronylaminoanthraquinone. A diluent such as 2 or 3 parts of chlorosulfonic acid may be employed, in which case the amount of sulfonating agent such as 25% oleum may be reduced to as low as 2.5 parts. The sulfuric acid employed will preferably range from 100% sulfuric acid (monohydrate) to 65% oleum, and the sulfonation may be carried out at temperatures of preferably from 15° to 25° C. when the more concentrated acid is employed, or at slightly higher temperatures such as about 20° to 30° C. when monohydrate is used. The sulfonation is continued until a test sample taken from the sulfonation mass is found to be soluble in water. Usually from 4 to 24 hours are required to complete this reaction. Where there water-soluble dyes are to be employed on cotton, it is often desirable to reduce the solubility so that a test sample is not readily soluble in cold water but is readily soluble in water at or near the boiling point.

When the product is over-sulfonated, the sulfonic acid content of the molecule may be reduced by heating the sulfonated product after the concentration of the acid is reduced to about 75% to 85% at from about 45° to 60° C. for a period of from 3 to 6 hours, or until the test sample is relatively insoluble in cold water but soluble at the boiling point.

The conditions employed in the sulfonation of these dyes as above given are quite specific, for with acid of lower concentration and with somewhat higher temperatures one obtains coeramidonine compounds which have distinctly different dyeing and other chemical properties from the compounds of the present invention.

In general, the sulfo compounds of this invention are isolated by the usual methods, such as by salting the drowned sulfonation mass with sodium chloride, filtering off the sodium sulfonate form of the dye, and washing it with a dilute salt solution until free of acid. The filter cake is either dried and used as a powder, or it is converted to a dye paste by ordinary milling, at which time dispersants or wetting agents may be incorporated.

Solubilities of the defined dyes may be varied by modifying M in the above formula. The free sulfonic acids (SO$_3$H), particularly of the lower molecular weight dyes, are quite soluble in water. This form may be isolated by drowning the partially diluted sulfonation mass in aqueous hydrochloric acid, filtering the mass on a Carborundum (silicon carbide) filter, washing the filter cake with concentrated hydrochloric acid to remove sulfuric acid, and drying the product. In an alternate process, the free sulfonic acid form of the dye is isolated by filtering the sulfonation mass from about 20% to 70% sulfuric acid. The well-pressed filter cake is slurried in concentrated hydrochloric acid, again filtered off, washed with hydrochloric acid of 2% to 10% concentration to remove sulfuric acid, and dried.

The alkali metal or ammonium sulfonates of the novel dyes are obtained either by salting out the drowned sulfonation masses with the respective inorganic salts, e.g. NaCl, $Na_2SO_4$, KCl, $K_2SO_4$, $NH_4Cl$ or $(NH_4)_2SO_4$, or by treating aqueous solutions of the dyes in their free sulfonic acid form with alakalies such as NaOH, $Na_2CO_3$, KOH, $K_2CO_3$ or $NH_4OH$, followed by filtration.

The sulfonated compounds of this invention may be classed as acid dyes, which type is usually suitable for application to materials such as wool and related fibers or materials such as silk, nylon and leather. Fibers made from these materials are conveniently dyed by these novel dyes from an acidic aqueous dye bath at elevated temperatures. Wool, for example, may be dyed at boiling temperature in dilute aqueous acetic or sulfuric acid dye baths in the presence of sodium sulfate. On leather, such as chrome tanned calf skin, the dyes are applied from their aqueous solution at 120° F. for 30 minutes, after which sufficient formic acid is added (usually 0.5% to 1% of the weight of the leather used) to exhaust the dye bath. Nylon is dyed by boiling the fabric for one to two hours in an aqueous solution of these novel dyes in the presence of 1% to 3% (on the weight of the fabric) of acetic acid. Natural silk is dyed from an aqueous solution of these novel dyes at 200° F. for one hour, after which the dye bath is exhausted with 1% to 10% of acetic acid (on weight of fabric), the silk is removed from the bath, rinsed and dried.

The dyes of the present invention, while dyeing wool and other chemically related fibers in the same manner as the usual acid wool dyes as described above, have also been found to be of value in the dyeing of cotton since they may be applied to cotton or other cellulose fibers from an alkali hydrosulfite vat, by the procedure usually employed in the dyeing of vat dyes, to give olive-to-gray-to-black shades very similar to the colors normally obtained by vat dyes containing the same general formula but which have not been sulfonated, and which have been ring closed by a caustic fusion to form one or more acridino rings in the dye molecule. Apparently in the dyeing of these colors from the usual alkali hydrosulfite vat, the sulfonic acid group is removed and ring closure is effected. The water-soluble acid dyes of this invention may also be ring closed to produce the olive-to-gray-to-black vat dyes in the absence of the fiber by applying alkaline reduction procedures such as by reacting in an alkaline hydrosulfite vat, by the reaction with zinc and sodium or potassium hydroxide, by reaction with hot aqueous sodium polysulfides $(Na_2S_x)$ where $x$ is 2 to 6, or by the caustic alcohol treatment such as with potassium hydroxide and methanol, generally referred to in this art as "alkaline fusions,"

Although the water-soluble sulfonic acid dyes of the present invention may be applied to cotton from an alkaline hydrosulfite vat, these novel multi-purpose dyes may also be applied to cellulosic fabrics by the so-called "pigment-pad" process and dye printing methods usually employed in the application of vat dyes.

The following examples are given to illustrate the preparation of these new dyes, in which the parts used are by weight unless otherwise specified.

The intermediates used in the following examples are prepared by the usual method of condensing halogen benzanthrones with aminoanthraquinone compounds including aminodianthrimides obtained by condensing halogen anthraquinones with diaminoanthraquinones. In general these condensations are carried out in a solvent such as nitrobenzene at temperatures of from 150° to 250° C. in the presence of a copper catalyst such as copper acetate and in the presence of an acid binding agent such as sodium carbonate, potassium acetate or mixtures of these or other acid binding agents, all of which is well known in the art.

*Example 1*

Forty (40) parts of 3,9-bis-(1-anthraquinonylamino)-benzanthrone, prepared by condensing 1 mol of 3,9-dibromobenzanthrone with 2 mols of 1-aminoanthraquinone, are dissolved at 20° to 25° C. in 200 parts of fuming sulfuric acid containing 25% by weight of $SO_3$ (25% oleum), and the solution is stirred at 20° to 25 C. until a test sample is soluble in water. After standing for ten hours, the solution is poured into 1200 parts of cold water and the drowned mass is stirred for one hour. 120 parts of NaCl are added and the slurry stirred at 40° C. for two hours. The sulfonation product is filtered off, washed with 10% sodium chloride solution until acid-free, and dried. The product thus obtained may be represented by the formula:

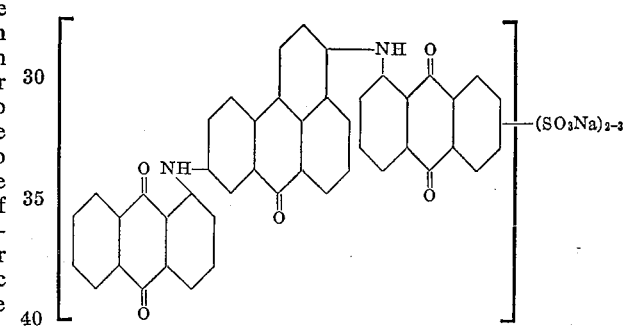

It dissolves in concentrated sulfuric acid with a brown color and dyes wool, silk, nylon and leather in brown shades. It also dyes cotton in a fast olive-gray shade from the usual alkaline hydrosulfite vat. A vat dye having substantially the same shade and fastness on cotton is obtained when the sulfonated compound of this example is first subjected to the well known alcohol-KOH fusion and then applied to cotton from the usual alkaline hydrosulfite vat.

*Example 2*

(a) Forty (40) parts of 1,5-bis-(3-benzanthronylamino)-anthraquinone, prepared by condensing 2 mols of 3-bromobenzanthrone with 1 mol of 1,5-diaminoanthraquinone, are dissolved at 20° C. in 200 parts of 25% oleum. After stirring for six hours at 24° C., the solution is allowed to stand over night at room temperature, then stirred for 15 minutes and poured into 1200 parts of cold water. After stirring the drowned mass for two hours, 120 parts of sodium chloride are added and it is stirred for two hours at 30° C. The sulfonation product is then filtered off, washed with a 10% sodium chloride solution until acid free, and dried. It is represented by the formula:

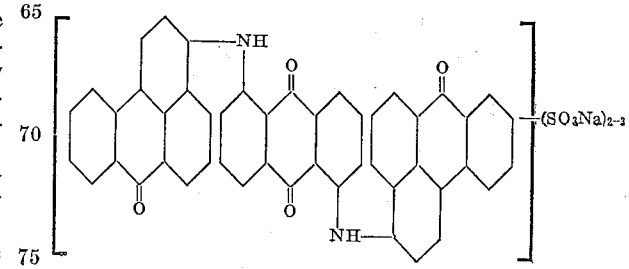

and dyes wool and related fibers in brown shades. In concentrated sulfuric acid the solution of the starting material is yellow, whereas that of the sulfo derivative is violet. The sulfonated product of this example dyes cotton from a red-violet alkaline hydrosulfite vat in olive shades of good fastness properties.

(b) Fifty (50) parts of 1,5-bis-(3-benzanthronylamino)-anthraquinone, prepared as described in part (a) of this example, are dissolved in a mixture of 100 parts of chlorosulfonic acid and 50 parts of 25% oleum at 15° to 17° C. After stirring the solution 0.5 hour, 100 parts of 25% oleum are added and the sulfonation mass is stirred for five hours at 21° C. The mass is poured into 1500 parts of a water and ice mixture, the drowned mass is stirred 0.5 hour, heated to 70° C., and 100 parts of sodium chloride are added slowly. The slurry is agitated while cooling to 25° C., the sulfonated product is filtered off, washed acid free with a 10% solution of sodium chloride, and dried. The red-brown wool dye thus obtained dyes cotton in olive shades from an alkaline hydrosulfite vat.

(c) When the 1,5-diaminoanthraquinone used in the condensation step of part (a) of this example is replaced with an equivalent amount of an approximately equal molar mixture of 1,5- and 1,8-diaminoanthraquinones, one obtains the corresponding isomeric mixture of 1,5- and 1,8 - bis - (3 - benzanthronylamino)-anthraquinones which after sulfonation as in part (a) has dyeing properties similar to the dye of part (a).

Example 3

Forty (40) parts of 1,5-bis-(3-benzanthronylamino)-2-methylanthraquinone, prepared from 2 mols of 3-bromobenzanthrone and 1 mol of 1,5-diamino-2-methylanthraquinone by the method described in Example 2 (a), are sulfonated in 200 parts of 25% oleum by the method described in Example 1. The sulfonation mass is drowned in 1200 parts of cold water. After stirring for 0.5 hour, 150 parts of sodium chloride are added and the slurry is stirred for three hours. The sulfonation product is filtered off, washed acid free with a 15% sodium chloride solution, and dried. It dissolves in concentrated sulfuric acid, giving a dull blue-green color, whereas the starting benzanthronylamino compound dissolves with a yellow-olive color. The sulfonated product of the structure:

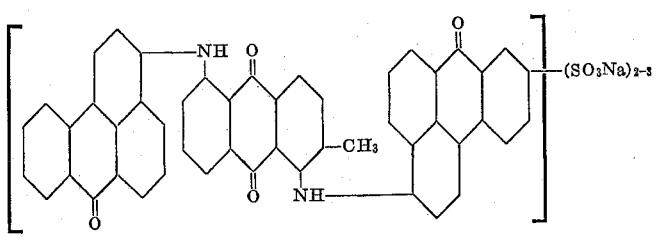

dyes wool and related fibers in brown shades and dyes cotton in gray shades from a bluish-brown colored alkaline hydrosulfite vat.

Example 4

Twenty-five (25) parts of the condensation product of equal molar proportions of 3-bromobenzanthrone, 1,5-diaminoanthraquinone and 1-benzoylamino - 4 - chloroanthraquinone, condensed in the order named and by following the procedure described in Example 1 of U.S.P. 2,505,234, are dissolved at 20° C. in 125 parts of 25% oleum. The solution is stirred for twelve hours at 22° C. and poured into 1000 parts of cold water. After stirring the drowned mass for two hours, 80 parts of sodium chloride are added and stirring is continued at 22° C. for five hours. The sulfonated product is filtered off, washed acid free with 8% sodium chloride solution, and dried. The product thus obtained is represented by the formula:

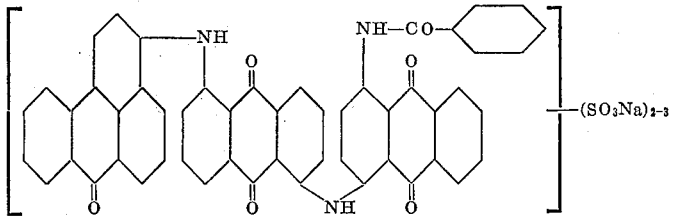

It dyes wool in brown shades and dyes cotton in green-grey shades from a brown-colored alkaline hydrosulfite vat.

Example 5

Forty (40) parts of 3,9-bis-(1-anthraquinonylamino)-benzanthrone are dissolved in a mixture of 100 parts of chlorosulfonic acid and 100 parts of 25% oleum at 15° to 20° C. The solution is stirred at 22° C. for nine hours and then poured into 1500 parts of a mixture of ice and water. After stirring the drowned mass for one hour, 120 parts of sodium chloride are added and stirring is continued for two hours. The sulfonated product is filtered off, washed acid free with a 10% sodium chloride solution, and dried. The product thus obtained dyes wool from an acidic aqueous dye bath in red-brown shades (brighter and redder as compared with the wool dye of Example 1), and it dyes cotton in olive shades from an alkaline hydrosulfite vat. An olive vat dye is also obtained when the sulfonated product of this example is fused in methanolic KOH at 127° C.

Example 6

Fifty (50) parts of the benzanthronylaminodianthrimide, prepared by condensing, first, equal molar proportions of 3-bromobenzanthrone and 1,5-diaminoanthraquinone and then condensing the resulting product with 2 - bromo - 3 - methylanthraquinone, by the process described in Example 1 of U.S. Patent 2,505,234, are dissolved in 125 parts of chlorosulfonic acid at 10° to 12° C. After stirring the solution for 0.5 hour, 125 parts of 25% oleum are slowly added at 10° C. and the sulfonation mass is stirred at 21° C. for ten hours. After the mass stands over night at room temperature, 50 parts of 25% oleum are added and the whole is stirred at 21° C. for six hours. The mass is poured into 1200 parts of a mixture of ice and water, the drowned slurry is stirred for 0.5 hour, heated to 60° C., and 100 parts of sodium chloride are added. The slurry is allowed to cool to 40° C., the sulfonated product is filtered off, washed acid free with a 10% solution of sodium chloride, and dried. The product thus obtained, represented by the formula:

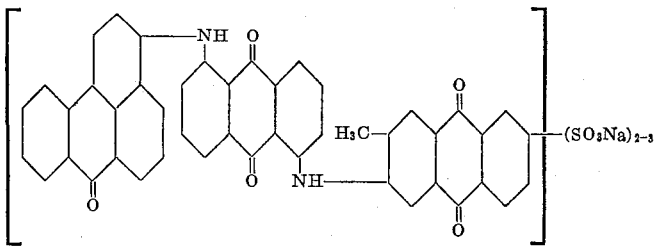

dyes wool and related fibers in full brown shades, and it dyes cotton in gray shades from a brown-colored, alkaline hydrosulfite vat.

*Example 7*

Thirty (30) parts of the bis-anthraquinonylaminobenzanthrone, prepared by condensing equal molar proportions of 3,9-dibromobenzanthrone, 1-aminoanthraquinone and 1-amino-4-benzoylaminoanthraquinone in the order named and by following the procedure of Example 6, are dissolved in 150 parts of 25% oleum at 15° to 18° C. The solution is then stirred for 24 hours at 21° C. and poured into 1000 parts of a mixture of water and crushed ice. The drowned mass is stirred 0.5 hour, heated to 55° C., 75 parts of sodium chloride are added, and the slurry is agitated while the temperature is allowed to drop to 20° C. The sulfonated product is filtered off, washed acid free with a 10% solution of sodium chloride, and dried. The product thus obtained, and represented by the formula:

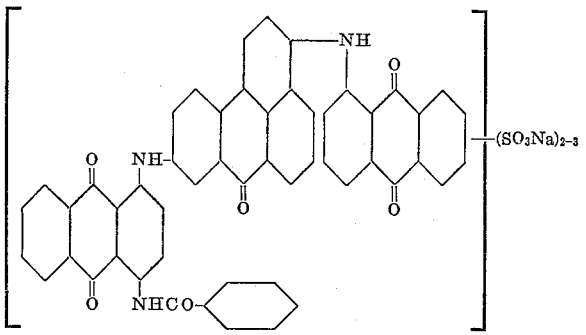

dyes wool in yellow-brown shades. It also dyes cotton in gray shades from an alkaline hydrosulfite vat.

*Example 8*

(a) Thirty (30) parts of 3,9-bis-(1-anthraquinonylamino)-benzanthrone are dissolved in a mixture of 60 parts of chlorosulfonic acid and 90 parts of 25% oleum at 18° to 20° C. and the solution is stirred for ten hours at 20° C. After standing overnight, a test sample of the sulfonation mass dissolves in water to form a clear solution. Then 90 parts of 50% sulfuric acid are added at 3° to 6° C. over a period of five hours. After standing over night, the mass is slowly heated (over 1.5 hours) to 50° to 52° C. and agitated at this temperature for three hours. A test sample is now quite insoluble in cold water. The mass is cooled to 22° C., poured into 1000 parts of cold water, and stirred for two hours. The product is filtered off, and washed acid free with a 2% solution of sodium chloride. It is represented by the formula:

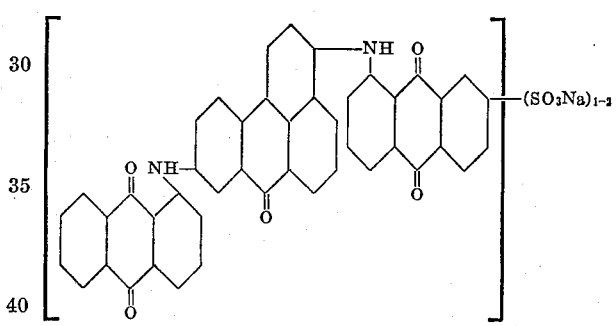

The product thus obtained dissolves in hot water, dyes wool in red-brown shades, and dyes cotton in olive-gray shades from an alkaline hydrosulfite vat.

(b) Thirty (30) parts of 3,9-bis-(1-anthraquinonylamino)-benzanthrone are dissolved in 300 parts of sulfuric acid monohydrate (100% $H_2SO_4$) at 13° to 15° C., then stirred for ten hours at 20° C. and allowed to stand over night. The mass is stirred at 30° C. for seven hours and cooled to 15° C. 75 parts of water are added at 15° to 18° C., the mass is slowly heated to 52° to 54° C. and stirred at this temperature for three hours. After cooling to 20° C., the mass is poured into 1500 parts of cold water and stirred for 0.5 hour. Thirty (30) parts of sodium chloride are added and the slurry is stirred at 50° C. for 0.5 hour. The sulfonation product is filtered off and washed acid free with a 2% solution of sodium chloride. It is essentially the same as the dye prepared in part (a) of this example.

(c) Forty (40) parts of 3,9-bis-(1-anthraquinonylamino)-benzanthrone are dissolved in a mixture of 150 parts of 100% $H_2SO_4$ and 250 parts of 25% oleum at 13° to 15° C., stirred for eleven hours at 22° C. and allowed to stand over night. After stirring the solution at 30° C. for three hours, it is cooled to 15° C. and 100 parts of water are added at 15° to 18° C. The mass is then stirred at 53° to 54° C. for 4.5 hours, cooled to 20° C. and poured into 2000 parts of cold water. After stirring the drowned mass for 0.5 hour, 40 parts of sodium chloride are added and the salted slurry is stirred at 50° C. for 0.5 hour. The product is isolated as described in part (b) of this example, and is essentially the same as the dye prepared in parts (a) and (b) of this example.

Example 9

Fifty (50) parts of the benzanthronylaminodianthrimide starting material described in Example 6 are dissolved in 250 parts of 25% oleum at 14° to 16° C., stirred for eleven hours at 23° C. and allowed to stand over night. 65 parts of water are added slowly at 15° to 20° C. hour, it is stirred at 53° C. for 4.5 hours, cooled to 20° C. and poured into 1500 parts of cold water. After slowly adding 50 parts of sodium chloride to the drowned mass at 70° C., it is cooled to 22° C. The sulfonated product is filtered off and washed acid free with a 2.5% solution of sodium chloride. The product thus obtained, represented by the formula:

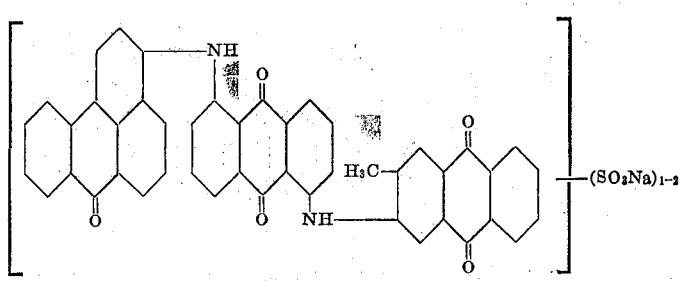

dyes wool in red-brown shades, and dyes cotton in level gray shades from an alkaline hydrosulfite vat.

In a similar manner, any of the benzanthronylaminodianthrimides described in U.S. Patent 2,505,234 may be sulfonated to yield wool dyes which may also be applied to cotton from an alkaline hydrosulfiite vat to give level gray shades.

Example 10

(a) Equal molecular proportions of 3-bromobenzanthrone and 1,5-diaminoanthraquinone are condensed in nitrobenzene by the process described in Example 1 of U.S. Patent 2,505,234. The mass is allowed to cool and the condensation product is filtered off, washed with methanol until free of nitrobenzene, and dried. The 3-(5-amino-1-anthraquinonylamino)-benzanthrone thus obtained has the structure:

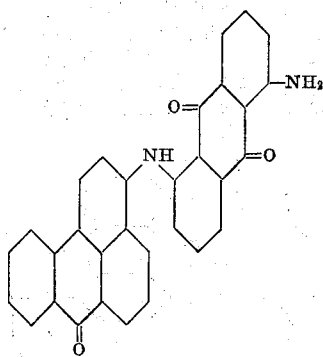

A mixture of 55 parts of the above condensation product, 450 parts of nitrobenzene, 31 parts of 1-chloroanthraquinone, 15 parts of sodium carbonate, 7.5 parts of potassium acetate and 2 parts of copper acetate is agitated and heated at 208° C. for 12 hours. After cooling to 50° C., the reaction mass is diluted with 400 parts of methanol and filtered. The filter cake is washed with methanol to remove the nitrobenzene, then with hot water to remove inorganic salts, and dried. The benzanthronylamino-dianthrimide thus obtained has the structure:

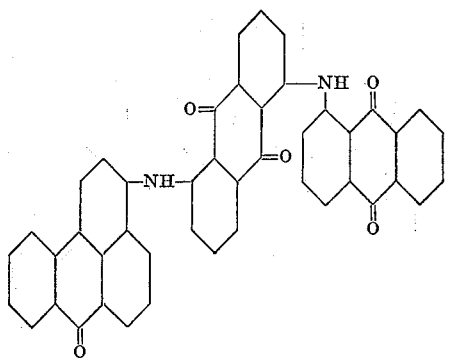

39 parts of this tri-nuclear compound are dissolved in 200 parts of 25% oleum at 15° C. and the solution is stirred for four hours at 20° C. A test sample is soluble in water. After adding 50 parts of water to the sulfonation mass at 15° to 20° C., it is agitated at 55° C. for four hours, cooled to 25° C., and poured into 1000 parts of cold water. The drowned mass is stirred 0.5 hour, heated to 60° C., treated with 50 parts of sodium chloride, and cooled to 30° C. The sulfonation product is filtered off and washed acid free with a 2% solution of sodium chloride. The dye thus obtained contains between 1 and 2 sulfo groups per molecule. It dyes wool from a hot acidic aqueous dye bath in brown shades, and dyes cotton in gray shades from an alkaline hydrosulfite vat.

(b) When the sulfonation step in part (a) of this example is repeated except that the solution is stirred at 20° C. for six hours, then drowned into 1200 parts of cold water, salted with 75 parts of sodium chloride, and the product is washed with a 5% solution of sodium chloride, a similar wool dye is obtained which contains between 2 and 3 sulfo groups per molecule.

(c) Dyes having similar properties are obtained when the 31 parts of 1-chloroanthraquinone used in part (a) of this example are replaced by 31 parts of 2-chloroanthraquinone or with 41 parts of 2-chloro-3-bromoanthraquinone and then sulfonating the respective tri-nuclear condensation products obtained by the procedures described in parts (a) and (b) of this example.

Example 11

One mol of 3,9-dibromobenzanthrone is condensed with one mol of the technical mixture of 1-amino-5(and 8)-chloroanthraquinones in nitrobenzene in the presence of sodium carbonate and copper acetate at 205° to 210° C. for six hours, and then two mols of 1-aminoanthraquinone are added and the mass is heated at 205° to 210° C. until a sample isolated from the reaction mass shows less than 1% total halogen by analysis. The tetra-nuclear product is a mixture of isomeric compounds represented by the formula:

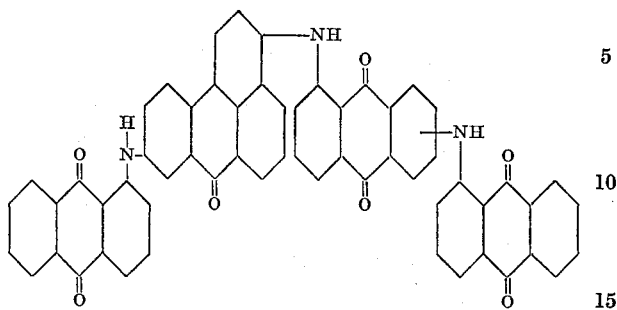

Fifty (50) parts of this product are dissolved in 250 parts of 25% oleum at 20° to 30° C. and the solution is stirred for sixteen hours at 25° C. A test sample is soluble in water at room temperature. The sulfonation mass is poured into 1500 parts of cold water. The drowned mass is stirred for one hour, treated with 150 parts of sodium chloride, heated to 40° to 42° C., and stirred for two hours. The sulfonation product is filtered off and washed acid free with a 10% solution of sodium chloride. The dye thus obtained contains between 2 and 3 sulfo groups per molecule. It dyes wool from a hot acidic aqueous dye bath in brown shades, and dyes cotton in gray shades from an alkaline hydrosulfite vat.

Similar results are obtained when the technical mixture of 1-amino-5(and 8)-chloroanthraquinones is replaced by an equal amount of either 1-amino-5-chloroanthraquinone or 1-amino-8-chloranthraquinone.

*Example 12*

A mixture of 33.5 parts of 1-aminoanthraquinone, 58.5 parts of 3,9-dibromobenzanthrone, 20 parts of sodium carbonate, 10 parts of potassium acetate and 2.5 parts of copper acetate are agitated in 400 parts of nitrobenzene at 172° C. for twelve hours. The mass is cooled to 50° C., 50 parts of nitrobenzene, 18 parts of 1,5-diaminoanthraquinone, 10 parts of sodium carbonate, 5 parts of potassium acetate and 2 parts of copper acetate are added, and the whole is heated at 208° C. for fifteen hours. After cooling the mass to 60° C., 400 parts of methanol are added. The product is filtered off, washed with methanol and hot water, in turn, and dried. It is represented by the formula:

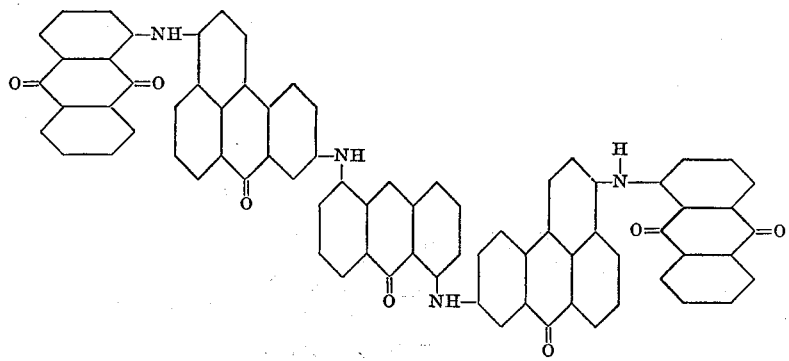

When sulfonated by the methods described in Examples 10 (a) and 10 (b), sulfo derivatives of this pentanuclear compound are obtained which dye wool in brown shades from a hot acidic aqueous dye bath, and dye cotton in gray shades from an alkaline hydrosulfite vat.

Similar results are obtained when the 1,5-diaminoanthraquinone employed in this example is replaced by 18 parts of a mixture of 1,5- and 1,8-daminoanthraquinones.

*Example 13*

A mixture of 50 parts of 3-bromobenzanthrone, 38.6 parts of 1,5-diaminoantharaquinone, 20 parts of sodium carbonate and 2 parts of copper carbonate are agitated in 700 parts of nitrobenzene at 205° to 208° C. for eight hours. The mass is cooled to room temperature, 22.4 parts of a technical mixture of 1,5- and 1,8-dichloroanthraquinones, 20 parts of sodium carbonate and 2 parts of copper carbonate are added, and the whole is heated at 205° to 208° C. for eight hours. After cooling the mass to 100° C., the product is filtered off and washed with nitrobenzene and alcohol in turn. The resulting filter cake is steam distilled until free of solvents. The product is filtered from the hot slurry, washed with hot water until alkali-free to Brilliant Yellow test paper, and dried. It is an isomeric mixture having the formula:

When sulfonated by the method described in Example 11, sulfo derivatives are obtained which dye wool in brown shades from a hot acidic aqueous dye bath and dye cotton in greenish-gray shades from an alkaline hydrosulfite vat.

Similar results are obtained when the mixed 1,5- and 1,8-dichloroanthraquinones of this example are replaced by 22.4 parts of either 1,5-dichloroanthraquinone or 1,8-dichloroanthraquinone.

Further illustrating the dyes of this invention is a list of benzanthronylaminoanthraquinones which on sulfonation as described in the specific examples above, give compounds containing from 1 to 3 sulfonic groups (—SO₃M) which dye wool and related fibers in brown shades and dye cellulose fibers from the usual alkali hydrosulfite vat in greenish-gray to black shades. The degree of sulfonation in each case is dependent on the desired use, but in all cases the dye should contain from 1 to 3 sulfonic acid groups (—SO₃M) with at least one sulfonic acid group per benzanthronyl radical in the molecule when the compound is to be used as a vat dye. The following compounds are prepared by carrying out the condensation of the halogen (Br or Cl) benzanthrones and amino and/or halogen anthraquinones by the processes more specifically illustrated in the above example, to give compounds of the general formula of each of the following examples, in which Bz and Aq designate benzanthroyl and anthraquinonyl radicals respectively, and the numbers at each side of the —NH— groups indicate the point of attachment to the adjoining benzanthronyl or anthraquinonyl radicals.

Example 14

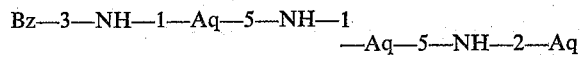

Prepared by condensing one mol of 5,5'-diamino-1,1'-dianthrimide with one mol of 3-bromo(or chloro)benzanthrone and then with one mol of a 2-halogen(Br or Cl)-anthraquinone.

Example 15

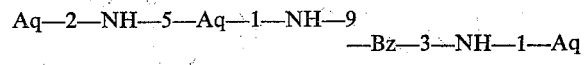

Prepared by condensing one mole of 3,9-dibromobenzanthrone with one mol of 1-aminoanthraquinone, then with one mol of 1,5-diaminoanthraquinone, followed by condensation with one mol of 2-bromoanthraquinone.

Example 16

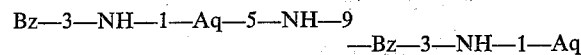

Equal-molar condensation product of 3-bromobenzanthrone and 1,5-diaminoanthraquinone is condensed with the equal-molar condensation product of 3,9-dibromobenzanthrone and 1-aminoanthraquinone.

Example 17

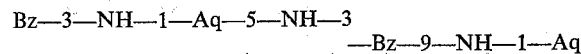

One mol of the equal-molar condensation product of 3-bromobenzanthrone and 1,5-diaminoanthraquinone is condensed with one mol of 3,9-dibromobenzanthrone, followed by condensation of the resulting monobromo trinuclear compound with one mol of 1-aminoanthraquinone.

Example 18

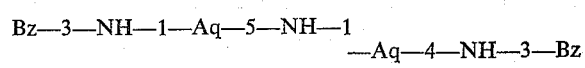

Two mols of 3-bromobenzanthrone are condensed with one mol of 5,4'-diamino-1,1'-dianthrimide. Likewise, the 5,4'-diamino-1,1'-dianthrimide may be replaced with an equivalent amount of either 5,5'-diamino-1,1'-dianthrimide or 5,5'-diamino-1,2'-dianthrimide.

Example 19

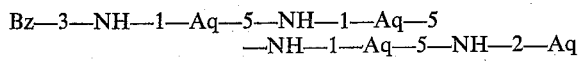

One mol of 1,5-dichloroanthraquinone is condensed with 2 mols of 1,5-diaminoanthraquinone; then the resulting diamino-trianthrimide is condensed with 1 mol of 3-bromo-benzanthrone and, finally, with 1 mol of 2-bromoanthraquinone. In this example the 1,5-dichloroanthraquinone may be replaced by an equivalent amount of 1,6-dichloroanthraquinone and 1 mol of 2-bromoanthraquinone with 1 mol of 1-chloroanthraquinone.

Example 20

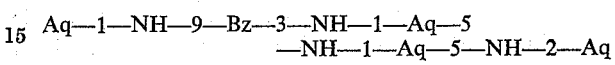

1 mol of 3,9-dibromobenzanthrone is condensed with 1 mol of 5,5'-diamino-1,1'-dianthrimide, then with 1 mol of 1-aminoanthraquinone, and the resulting product condensed with 1 mol of 2-bromoanthraquinone.

Example 21

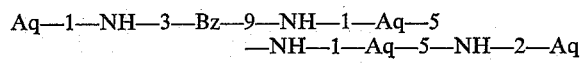

The equal-molar condensation product of 1-aminoanthraquinone and 3,9-dibromobenzanthrone is condensed with 1 mol of 5,5'-diamino-1,1'-dianthrimide, followed by condensation with 1 mol of 2-bromoanthraquinone.

Example 22

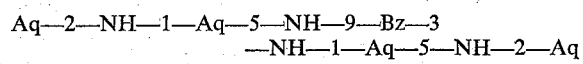

One mol of 3,9-dibromobenzanthrone is condensed with 2 mols of 5-amino-1,2'-dianthrimide.

Example 23

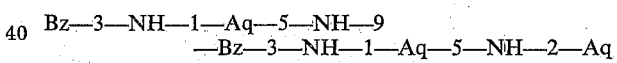

One mol of 3,9-dibromobenzanthrone is condensed with 2 mols of 1,5-diaminoanthraquinone, and the resulting diaminotrinuclear product is condensed successively with 1 mol each of 2-chloroanthraquinone and 3-chlorobenzanthrone.

Example 24

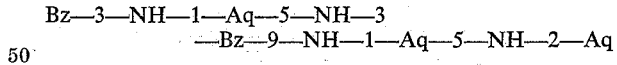

The condensation product of 1 mol each of 3-bromobenzanthrone and 1,5-diaminoanthraquinone is condensed with 1 mol of 3,9-dibromobenzanthrone, and the resulting monobromo trinuclear product is condensed with 1 mol of 5-amino-1,2'-dianthrimide.

Example 25

One mol of the equal molecular condensation product of 3-bromobenzanthrone and 5,5'-diamino-1,2'-dianthrimide is condensed with 1 mol of the equal molecular condensation product of 3,9-dibromobenzanthrone and 1-aminoanthraquinone.

Example 26

One mol of 5,5'-diamino-1,2'-dianthrimide is condensed successively with 1 mol each of 3-bromobenzanthrone and 3,9-dibromobenzanthrone, and the resulting monobromo tetranuclear product is condensed with 1 mol of 1-aminoanthraquinone.

Example 27

Aq—1—NH—9—Bz—3—NH—1—Aq
        —5—NH—9—Bz—3—NH—1—Aq

One mol of 3,9-dibromobenzanthrone is first condensed with 1 mol of 1-aminoanthraquinone, then with 1 mol of 1,5-diaminoanthraquinone. The resulting monoamino trinuclear product is condensed with 1 mol of 3,9-dibromobenzanthrone, and the resulting monobromo compound is condensed with 1 mol of 1-aminoanthraquinone.

Example 28

Aq—1—NH—9—Bz—3—NH—1—Aq
        —5—NH—3—Bz—9—NH—3—Bz

One mol of 1,5-diaminoanthraquinone is condensed with 2 mols of 3,9-dibromobenzanthrone, and the dibromo trinuclear product thus obtained is condensed with 2 mols of 1-aminoanthraquinone.

Example 29

Bz—3—NH—1—Aq—5—NH—9—Bz—3
        —NH—1—Aq—5—NH—3—Bz

One mol of 3,9-dibromobenzanthrone is condensed with 2 mols of 1,5-diaminoanthraquinone, and the diamine trinuclear product obtained is condensed with 2 mols of 3-bromobenzanthrone.

Essentially the same pentanuclear compound is obtained when 1 mol of 3,9-dibromobenzanthrone is condensed with 2 mols of the equal-molar condensation product of 3-bromobenzanthrone and 1,5-diaminoanthraquinone.

While the 3,9-dibromobenzanthrone in the above condensations reacts selectively on the 3-position first and then on the 9-position, the 1,5-diaminoanthraquinones when reacted with only one mol of a halogen compound should be carried out under more moderate conditions than when condensation is to take place on both 1- and 5-positions as more particularly illustrated in U.S. Patent 2,505,234.

The new sulfonic acid derivatives of this invention are apparently converted to the benzanthroneanthraquinoneacridines during the vatting process, and thereby provide a series of dual purpose dyes which are useful for dyeing animal fibers and cellulosic materials.

I claim:

1. The water-soluble product of the process which comprises reacting (1) a benzanthronylaminoanthraquinone compound having a molecular linkage selected from the group consisting of (a) X—Bz—NH—Aq—NH—Bz—X, (b) X—Aq—NH—Bz—NH—Aq—X, and (c) X—Bz—NH—Aq—NH—Aq—X wherein said Bz and Aq stands for benzanthronyl and anthraquinonyl radicals, respectively, and said X is selected from the group consisting of —H, —NH—Bz, —NH—Aq, —NH—Bz—NH—Aq, —NH—Aq—NH—Bz and —NH—Aq—NH—Aq each benzanthronyl radical in said compounds forming with an aminoanthraquinonyl radical a nucleus of the formula:

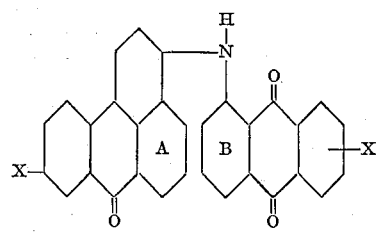

in which X stands for the same as above, there being not more than three Bz radicals and not more than a total of five Aq and Bz radicals in each complete molecule; in each case where the benzanthronyl radical is attached to a second anthraquinonyl radical in the molecule, it is through its 9-position to an alpha position of said second anthraquinonyl radical; and simple substitution products of said benzanthronyl-aminoanthraquinone compounds, said substitutents being selected from the group consisting of Cl, Br, CH$_3$, NH$_2$ and —NHCOC$_6$H$_5$, and said substituents being located in rings other than A and B; with (2) fuming sulfuric acid containing 25% by weight SO$_3$ at a temperature of from 15° to 30° C. for from 4 to 24 hours, said product containing from 1 to 3 sulfonic acid groups.

2. The water-soluble product of the process which comprises reacting a benzanthrone compound having the general formula:

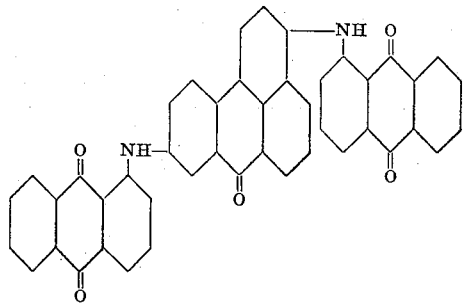

with fuming sulfuric acid containing 25% by weight of SO$_3$ at a temperature from 20° to 25° C. for from 4 to 24 hours said product containing from 2 to 3 sulfonic acid groups.

3. The water-soluble product of the process which comprises reacting an anthraquinone having the general formula:

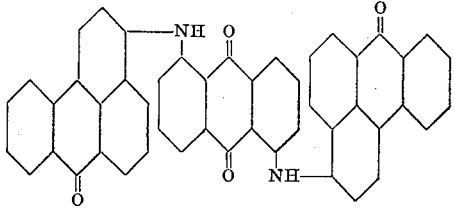

with fuming sulfuric acid containing 25% by weight of SO$_3$ at 24° C. for six hours.

4. The water-soluble product of the process which comprises reacting a benzanthronylaminodianthrimide having the general formula:

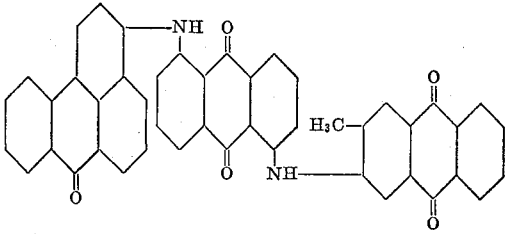

with fuming sulfuric acid containing 25% by weight SO$_3$ at 23° C. for 11 hours.

References Cited by the Examiner

UNITED STATES PATENTS

| | | | |
|---|---|---|---|
| 1,711,710 | 5/1929 | Wolff | 260—364 |
| 2,227,543 | 1/1941 | Gutzwiller | 260—364 |
| 2,293,709 | 8/1942 | Buxbaum | 260—364 |

FOREIGN PATENTS

| | | |
|---|---|---|
| 861,921 | 2/1941 | France. |
| 1,126,877 | 12/1956 | France. |

LORRAINE A. WEINBERGER, *Primary Examiner.*

LEON ZITVER, *Examiner.*